United States Patent
Bitzer et al.

(10) Patent No.: US 6,292,741 B1
(45) Date of Patent: Sep. 18, 2001

(54) OVERALL MOTOR VEHICLE CONTROL

(75) Inventors: Rainer Bitzer, Weissach; Juergen Bauer, Leonberg; Udo Diehl, Stuttgart; Werner Kind, Markgroeningen; Holger Bellmann, Ludwigsburg; Volker Pitzal, Waldstetten; Martin-Peter Bolz, Oberstenfeld; Werner Hess, Stuttgart; Rainer Mayer, Weil der Stadt; Christian Tischer, Hemmingen; Christian Grosse, Kornwestheim; Udo Schulz, Vaihineg/enz; Marko Pojansek, Reutlingen; Torsten Heidrich, Vaihingen/enz, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/376,772

(22) Filed: Aug. 17, 1999

(30) Foreign Application Priority Data

Aug. 24, 1998 (DE) .................................. 198 38 333

(51) Int. Cl.$^7$ .............................. G06F 7/70; F02D 41/26; B60K 41/04
(52) U.S. Cl. .............................. 701/115; 701/103; 701/35
(58) Field of Search .................................. 701/101, 102, 701/103, 115, 29, 31, 35

(56) References Cited

U.S. PATENT DOCUMENTS

| | | | | |
|---|---|---|---|---|
| 5,297,048 | * | 3/1994 | Gauer | 701/115 |
| 5,351,776 | | 10/1994 | Keller | 701/70 |
| 5,444,626 | * | 8/1995 | Schenk | 701/115 |
| 5,446,665 | * | 8/1995 | Adrain et al. | 701/115 |
| 5,794,165 | * | 8/1998 | Minowa et al. | 701/115 |
| 5,916,296 | * | 6/1999 | Honda | 701/115 |

FOREIGN PATENT DOCUMENTS 196 37 210 A  3/1998 (DE).

* cited by examiner

Primary Examiner—Willis R. Wolfe
(74) Attorney, Agent, or Firm—Michael J. Striker

(57) ABSTRACT

A computer system for controlling the operation of a drive of a motor vehicle includes a plurality of different predetermined components each including at least one functional unit. Such components include a first component representing the motor vehicle as a whole and second component representing the drive. A plurality of interfaces is interposed between these components, being operative for transmitting data between such components. At least one storage stores information concerning such components and interfaces. The functional units mentioned above and the vehicle as a whole are controlled by controlling the above-mentioned components inclusive of the first component. In performing the control, request signals and inquiry signals are generated and transmitted through the interfaces between the components. The operation of the drive is controlled in dependence on the data exchanged between the components through the interfaces.

16 Claims, 11 Drawing Sheets

OVERALL MOTOR VEHICLE CONTROL

BACKGROUND OF THE INVENTION

1. Field of the Invention

The present invention relates to motor vehicles in general, and more particularly to a computer system for controlling the operation of a drive system of a motor vehicle.

2. Description of the Related Art

There are already known various constructions of control systems for motor vehicles. In most if not all of them, the software used for controlling the operation of the various functional units of the motor vehicle is structured in accordance with the functions in these functional units. However, there exists the possibility that various functions attempt to control the operation of one and the same adjusting element. Ability to exchange parts of the software is possible only at a huge expenditure. Modular configuration is not supported in such prior art control systems.

For improving this situation, there was proposed for instance in the U.S. Pat. No. 5,351,776 a control process or a control device by means of which control is exercised of the entire vehicle, at least with respect to the driving power, the motor power, and the braking process. The arrangement described in this document exhibits a hierarchical command structure for the control tasks, which considers the driver and/or his or her wishes (as expressed by activating various pedals, buttons etc.) to be at the highest level of the hierarchy. The control structure disclosed there includes coordinating elements that translate any command emanating from a higher hierarchic level into commands for the elements of a subordinate hierarchic level. The contents of the commands that are transmitted from above to below in the hierarchic structure constitute physical values that determine the interfaces between the individual hierarchic levels. Herein, the above-mentioned interfaces are configured to take into account the physical characteristics of the vehicle motion. This publication does not even allude to a possibility that would go beyond the disclosed concepts in considering, for instance, the auxiliary apparatus and/or devices (such as air conditioning unit, seNo pump or the like) or the on-board electrical network in the overall framework of a motor vehicle operation control. Yet, in view of the ever-increasing tendency in the motor vehicle manufacturing industry to interconnect previously stand-alone systems in vehicle one-board networks, the exclusive consideration of the drive and brake is no longer sufficient. Rather, it is becoming necessary to embed the drive control into the control structure for the entire motor vehicle by means of which also the systems that lie outside the drive system and its communications relationships could be coupled and coordinated with the drive control system, of which there is not even a suggestion in this document.

Moreover, the not pre-published German patent application 197 09 317.5 filed on Mar. 3, 1997 discloses the principle of another hierarchic basic structure of an overall vehicle operation control or management system. In this case, a motor vehicle coordinator element is a command issuer for the components drive (as a source of mechanical power, vehicular motion, vehicle body and interior, and on-board electrical network (as a source of electrical power). The communication between these individual components of this structure occurs exclusively in a mediate fashion via components that are superior to these components by being at hierarchic level(s) higher than these components, and even in these associated superior components in accordance with rigidly predetermined communication relationships. These communications relationships are an order or command that is issued generally by a component at a higher level of the hierarchy to a component at a lower hierarchic level and must be obeyed or followed by this latter component, a request that can be issued by a component even at a lower hierarchic level to a component at a higher hierarchic level and should be acted upon or fulfilled by such a latter component, and an inquiry to which a response is expected from the component that had been questioned. The control of the operation of the motor vehicle is accomplished within the framework of the above-described relationships between the components. For the control of the operation of the motor vehicle, there are transmitted rigidly predetermined physical values that constitute defined interfaces between the individual components. Detailed implementation of the components drive train and motor with respect to the gasoline or Diesel fuel management while taking into consideration of the relevant communication relationships in the overall motor vehicle system is not revealed in this disclosure.

From the also not pre-published German patent application 197 26 214.7, filed on Jun. 20, 1997, there is known the principle of a common control of a servo coupling interposed in the drive train and of a motor that is also arranged in the drive train with a gas pedal the position of which is being captured. On encountering a predetermined operational mode, the servo coupling and the vehicle motor are controlled in such a manner that the captured position of the gas pedal determines the acceleration and/or the speed of the vehicle. Integration of the control arrangement into the overall control system of a motor vehicle and the communications relationships that would have to exist under such circumstances are not disclosed in this document either.

OBJECTS OF THE INVENTION

Accordingly, it is a general object of the present invention to avoid the disadvantages of the prior art.

More particularly, it is an object of the present invention to provide a motor vehicle control or management system that does not possess the drawbacks of the known systems of this type.

Still another object of the present invention is to devise a control system of the type here under consideration which is well suited for controlling the operation of the motor vehicle in its entirety.

It is yet another object of the present invention to design the above control system in such a manner that the power demands of the components of the motor vehicle that are not integral parts of the motor/drive train arrangement are taken into consideration in controlling the operation of the latter.

A concomitant object of the present invention is so to construct the control system of the above type as to be relatively simple in construction, flexible and adaptable to various present or future requirements, inexpensive to manufacture, easy to use, and yet reliable in operation.

SUMMARY OF THE INVENTION

In keeping with the above objects and others which will become apparent hereafter, one feature of the present invention resides in a computer system for controlling the operation of a drive of a motor vehicle. This control system includes a plurality of different predetermined components including a first one representing the motor vehicle as a whole and second one representing the drive. Each of such components includes at least one functional unit, and a plurality of interfaces is interposed between the components, being operative for transmitting data between the components. According to the invention, there is further provided means including at least one storage for storing information concerning the components and the interfaces, and means for controlling the functional units and the vehicle as a whole by controlling the components and the first component, including means for generating request signals and inquiry signals for transmission through the interfaces between the components. Last but not least, the control system also includes means for controlling the operation of the drive in dependence on the data exchanged between the components through the interfaces.

A particular advantage of the present invention as described so far is that, by defining the relationships between the physical components of the vehicle in the various components of the control system of which the vehicle as a whole is one, and by conducting the data interchange, to the extent possible, within the control system before commands are issued to or inquiries are made from the physical components of the vehicle, it is possible to avoid the heretofore existing need for an overall hierarchic (master/slave) scheme; rather, this relationship exists only between the control system and the controlled system (including the vehicle as a whole), but not necessarily in the control system itself which makes the control much more flexible than before and easily adaptable to various needs, not only those existing at the present (gasoline engines and Diesel-fuel powered engines on the one and the other hand being just the most prominent examples of such diverse needs) but also those occurring in the future (such as the addition of further physical components and/or power consumption requirements to the motor vehicle, or to future models).

Advantageously, the first component incorporates at least additional components vehicle body and interior, vehicle movement, on-board electrical network, and drive train, and additional interfaces between such additional components. It is these constituent components of the overall vehicle control system that are the sources of the various control signals and/or their processors, and they are thus constructed, and interfaced with the other control system components, accordingly. So for instance, the additional component vehicle body and interior includes at least a further component indicator devices. This additional component may also include at least a further component air conditioning, and at least one further interface between such further components. This additional component may also include further components comfort electronics, and telecommunications and multimedia, and further interfaces between such further components.

In a similar vein, the additional component vehicle movement is subdivided into at least further components drive, brake, steering and coordinator of vehicle movement, and includes further interfaces between the further components for transmitting at least one of torque request signals, brake inquiry signals and power inquiry signals. Similarly, the additional component on-board electrical network includes at least further components generator, and battery, and further interfaces between the further components for transmitting power request signals to the further component generator, and power inquiry signals to the further component battery. This additional component on-board electrical network may also include another component switching means, and another interface for transmitting starting operation release inquiry signals.

In accordance with another aspect of the present invention, the additional component drive train includes at least further components transmission, motor, and drive, and further interfaces between the further components for transmitting positive engagement inquiry signals, engaged gear inquiry signals, and torque request signals. Then, the means for controlling the operation of the drive is operative for presenting a power request signal to the additional component drive train. The additional component drive train may also include another component drive train coordinator, and another interface between the latter and the further components for transmitting transmission ratio, slippage, rotational speed, and torque request signals thereto.

Another facet of the present invention is to be seen in the fact that the additional component motor may include at least further components motor mechanics, fuel injection system, and combustion air system, and further interfaces between the further components for transmitting at least one of rotational speed and limitation inquiry signals from the further component motor mechanics, for transmitting at least one of rotational speed inquiry and torque request signals from the further component injection system, and for transmitting at least one of rotation speed, injected fuel amount and combustion air mass inquiry signals from the further component combustion air system.

Especially when the computer system is implemented for use in Diesel-fuel powered vehicles, it may further be provided with yet another interface for transmitting smoke level inquiry signals the from the additional component drive mechanics. On the other hand, for use especially in gasoline-fuel powered vehicles, the additional component motor includes at least further components motor mechanics, exhaust system, fuel system, fuel injection system, ignition system, combustion air system, and motor coordinator, and further interfaces between the further components for transmitting at least one of rotational speed, position and temperature inquiry signals from the further component motor mechanics, for transmitting an operation mode request signal from the further component exhaust system, for transmitting at least one of operation mode and rail pressure request signals from the further component fuel system, for transmitting at least one of operation mode and fuel mixture composition request signals and at least one of filling degree and rotational speed inquiry signals from the further component fuel injection system, for transmitting at least one of operation mode and efficiency request signals and filling value and rotational speed inquiry signals from the further component ignition system, for transmitting at least one of at least one of rotational speed and filling degree inquiry signals, and at least one of operation mode and desired filling degree request signals from the further component combustion air system, and for transmitting at least one of at least one of rotational speed, efficiency and filing degree inquiry signals, and torque request signals from the further component motor coordinator.

Advantageously, the further component motor coordinator is located externally of the further component motor and is interposed between the additional component motor and the remaining ones of the further components into which the additional component motor is subdivided. It is further advantageous for the initially mentioned components to include components vehicle movement coordinator, drive, auxiliary devices, vehicle coordinator, transmission, and drive train coordinator. Then, the means for controlling the operation of the drive is operative for controlling the latter in dependence on torque request signals derived from the component vehicle movement coordinator, at least one of rotational speed and torque request signals derived from the component drive, at least one of rotational speed and torque request signals derived from the component auxiliary devices, at least one of rotational speed and torque request signals derived from the component vehicle coordinator, at least one of rotational speed and torque request signals derived from the component transmission, and at least one of rotational speed and torque request signals derived from the component drive train coordinator.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
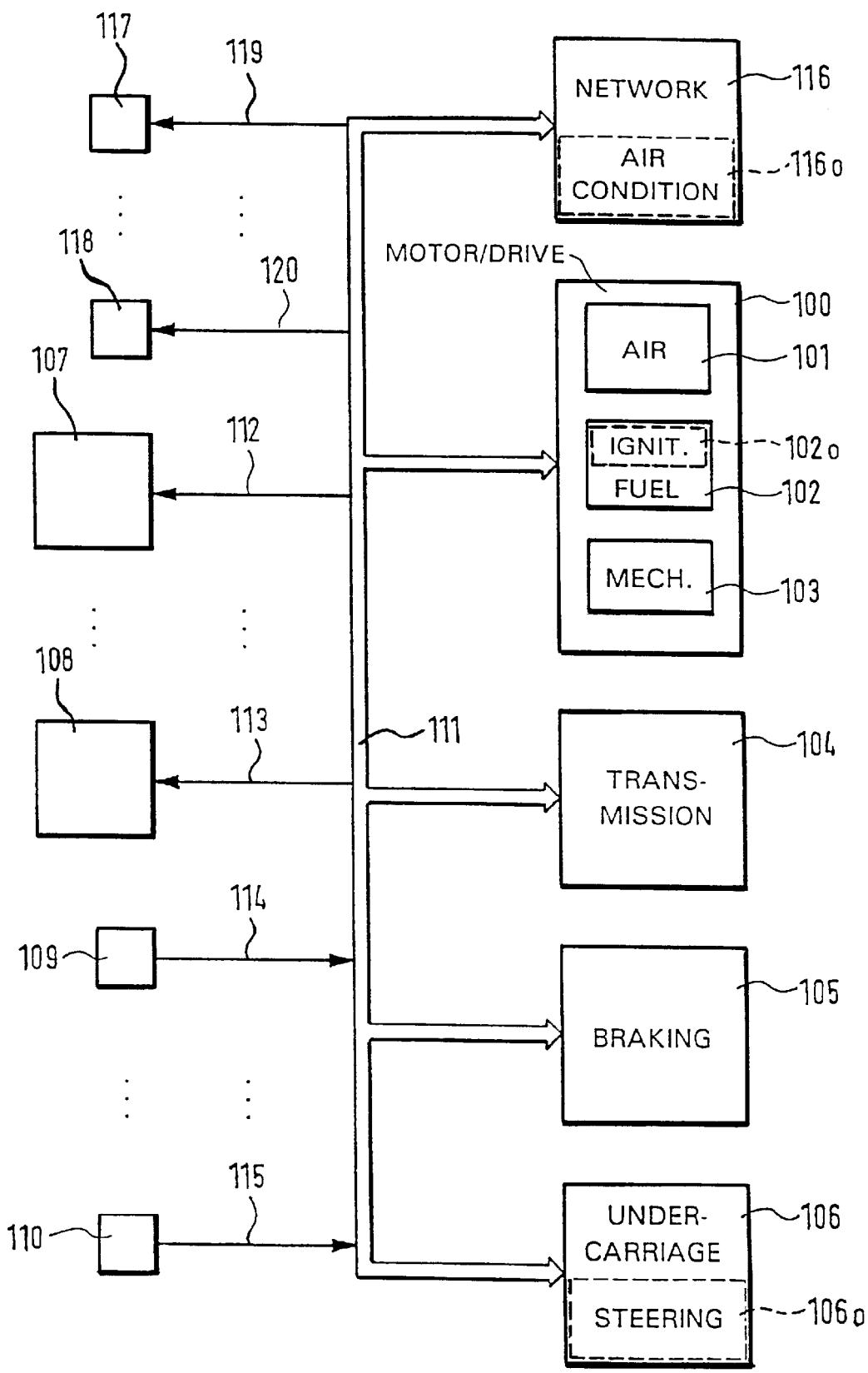
FIG. 1 is a block diagram of a configuration of a control system embodying the present invention as employed in a motor vehicle equipped with a wire or bus system.

Referring now to the drawing in detail, and first to FIG. 1 thereof, it may be seen that it reveals an implementation of an overall control system of a motor vehicle, embodying the present invention. It is to be mentioned at this juncture that this control system includes a multitude of interconnected components or units which, in addition to having assigned to them respective reference numbers, are also identified by descriptive legends. In order not to unduly encumber the drawing while assuring clarity, however, these legends have been shortened by omitting from them expressions such as "component", "control unit" or the like (hence merely designating the motor vehicle part or function controlled by or otherwise in data-exchange relationship with such a component or unit if the control system) or even more drastically, even to the extent of using abbreviations when necessary, and these legends have placed, to the extent feasible, within the box-like representations of such components or units. So, for instance, the reference numeral 100 has been used in FIG. 1 to identify a control unit for controlling the operation of the motor or of the drive unit of the motor vehicle, but the legend refers to it merely as a "motor/drive". This convention will be adhered to throughout the drawing, whereas the text will refer to such components or units as such, mostly in reversed word order, and not only with the names of the motor vehicle parts from which they receive and/or to which they send data.

As far as hardware is concerned, the motor/drive unit 100 includes an air system control unit 101 (e. g. for combustion air amount control), and a fuel injection system control unit 102 (e.g. for fuel amount control), which latter may optionally be equipped with an ignition control unit 102o, generally referred to merely by the abbreviation "ignit." standing for ignition, meaning spark issuance timing control in the event that the motor being controlled is designed for combusting gasoline or similar spark-ignitable fluid (referred to herein as gas engine), and controlling the glow plug system when the motor is question is to run on Diesel fuel (a Diesel engine). The motor/drive control unit 100 is further shown to include a drive or motor mechanics control unit 103 ("mech."), for instance for the calculation of the motor driving torque, for the protection from mechanical overload, for the determination of the rotational speed of the motor and of the crankshaft angle, etc. In addition, there are also shown in the drawing a control unit 105 for controlling the operation of the vehicle brakes and/or the braking process, a control unit 104 for controlling the operation of the automatic transmission, and/or a control unit 106 for controlling the undercarriage adjustment and/or for the regulation of the driving dynamics, wherein a steering control unit 106o for the possible implementation of intervention into the operation of the steering system (steer by wire) may optionally be incorporated into the control unit 106. Moreover, in the event that the vehicle is equipped with an electronically controlled on-board network, there can also be provided a control unit 116 for controlling the operation of the on-board network. Integrated into this control unit 116 may be control units for controlling the operation of individual or several auxiliary devices or indicator devices. So, for instance, it is revealed in FIG. 1 of the drawing that a control unit 116o for controlling the operation of the vehicle air conditioning equipment may optionally be integrated into the on-board network control unit 116.

An electrical conductor or bus system 111 (for instance a CAN bus) connects the individual control units or control devices for mutual exchange of information and data. To this electrical conductor or bus system 111, there are connected, by means of associated electrical conduits 114, 115, which are constructed for instance for an arbitrary number, various measuring devices 109, 110, of which also just two of an arbitrary number are shown as representative examples. These measuring devices 109, 119 etc. capture various operating parameters or characteristics of the vehicle, especially of the motor and or the drive train. Herein, the thus captured operating parameters constitute the generally known operating characteristics, such as the rotational speed of the motor, motor temperature, rotational speed of the drive train, transmission condition or transmission ratio, engaged gear information, hydraulic converter slippage, turbine rotational speed, generator rotational speed, driving speed, battery voltage, etc. In addition thereto, adjustment devices 107, 108 are connected by corresponding electrical conductors 112, 113 to the bus system 111. Here again, there are only illustrated by way of example two of the adjustment devices 107, 108 which represent the multitude of different adjustment devices that may be present in the motor vehicle. Such devices are, for instance, ignition systems, electrically controllable throttling flaps, fuel injection systems, setting devices of an automatic transmission such as, for example, couplings or gear shifters, electrically controllable shock absorber elements, pressure systems for brake actuation, the servomotor incorporated in the steering system, as well as adjustment motors for instance for electric window lowering and/or raising, the sliding roof of the car body and the car interior electronics. There are further shown, as representative examples of a multitude of such elements, two indicator devices 117 and 118 that also belong to the car body and car interior electronics and that are connected with the bus system 111 by respective electrical conductors 119 and 120. These indicator device 117 and 118, which are for instance of the optical or acoustic type, are shown to be separate from the adjustment elements or devices 107 and 108.

The various control units depicted in FIG. 1 of the drawing perform the functions entrusted to them while the operating characteristics needed for such performance are being captured, and generate control values or signals for the various adjustment devices and indicator devices. As a result of the use of such an interconnected system as illustrated, the individual elements or functional units cannot be considered separately any longer but rather must be viewed as being tied into the overall concept. So, for instance, in the drive or motor control, there must be taken into account not only the torque or power requirements or predetermined rotational speed values relating to the motor vehicle movement, such as the steering, brake or driving dynamics regulation, but also the power or torque requirements and/or rotational speed information of all of the auxiliary devices and adjustment devices. In addition to this, there also presents itself the possibility to achieve drive control that is optimally fitted to the then existing conditions by referring to and using data and information derived from other functional units and systems, such as, for instance, environmental data, driving condition values, vehicle values and user values.

Figure 2:
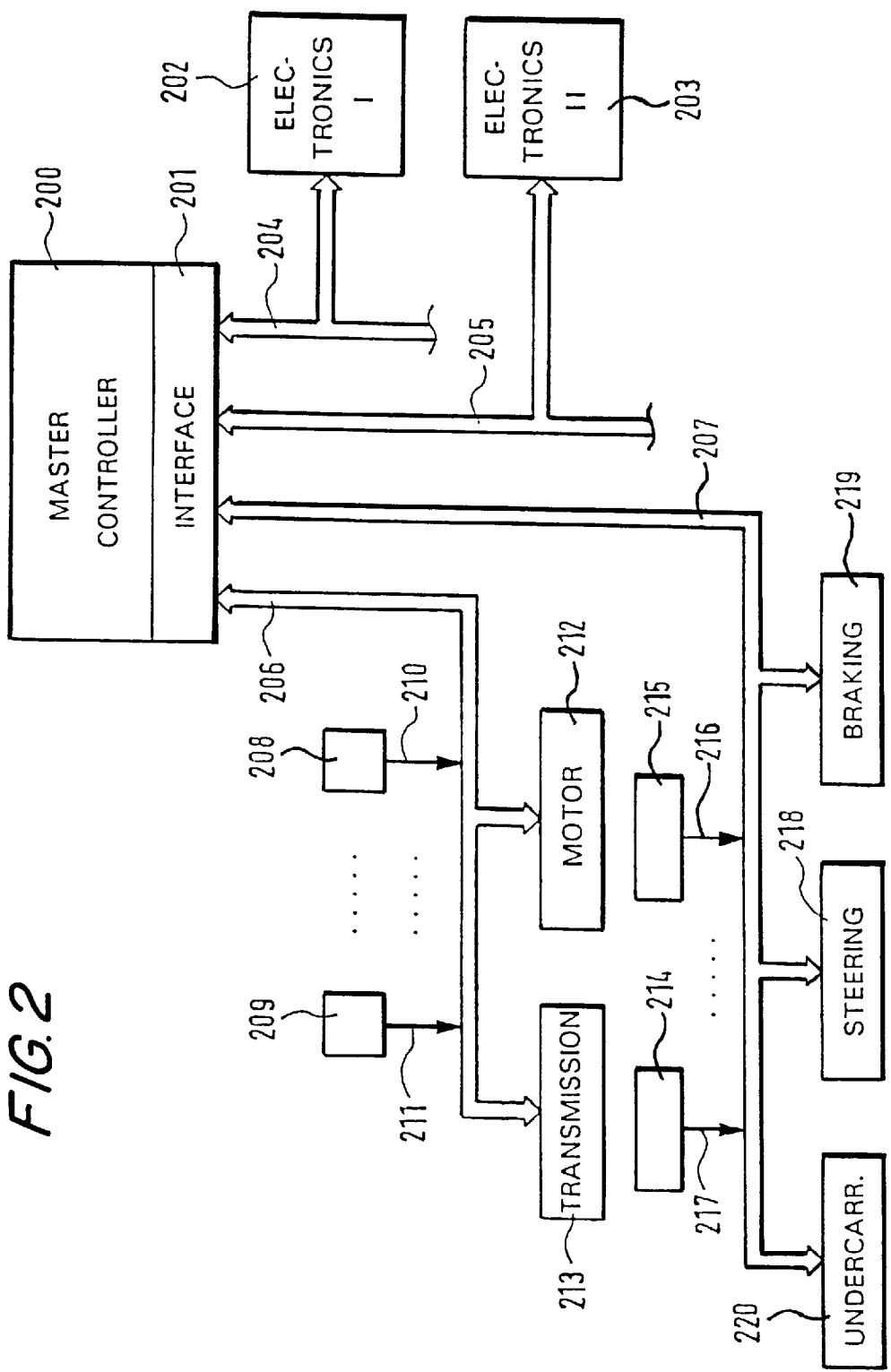
FIG. 2 is a block diagram akin to that of FIG. 1 but showing a hardware configuration for a networked control system of a motor vehicle including more than one bus or wire system.

A further example of a possible hardware configuration of a control system for a motor vehicle is presented in FIG. 2 of the drawing. Herein, the reference numeral 200 identifies a so-called master controller which includes, among others, an interface (gateway) 201 to which there are connected several, for instance different, bus systems. In contrast to the arrangement depicted in FIG. 1, it is possible here, owing to the use of several electrical conductor or bus systems and the resulting optimized use of various transmission rates for the information or data, to achieve a more flexible adaptation of the functional units to the requirements encountered in the motor vehicle. However, the separation of these bus systems is only by way of an example. A first bus system 206 makes possible the communication of the master controller 200 with, for instance, the elements 208 to 213 that control the operation of the drive. So, for instance, the box 212 represents a motor adjustment unit and the box 213 a controlling unit for controlling the operation of a transmission. Associated electrical conductors 210 and 211 assure that input data needed for controlling the driving torque, for instance in the form of measured values derived from measuring devices 208, 209, are supplied to the bus 206 and thus to the control units 213, 212. Here, too, the measuring device 208, 209 and the associated electrical conductors 210, 211 are shown as being merely two, but the dot rows extending between them serve to document the configuration bandwidth possible in this respect. The operating parameters of the vehicle and/or the motor that are captured by the measuring device 208, 209, such as for instance the rotational speed of the motor, supplied combustion air volume or air mass, vehicle load, driving speed, exhaust gas composition, engine temperature, transmission gear ratio, switched condition of a hydraulic converter (e.g. gear ratio information), slippage, knocking tendency etc. are herein supplied into the bus 206. The bus 207, for instance, connects the master controller 200 or its gateway 201 with the functional units controlling the vehicle, especially the undercarriage. These are functional or control units 219 for controlling braking, 218 for controlling steering and/or 220 for controlling the undercarriage. Analogously to what was described above in connection with the bus 206, operational characteristics or parameters of the vehicle, especially the operational characteristics necessary for controlling the drive, are coupled from respective measuring devices 214, 215 through electrical connectors 216, 217 into the bus 207. These can be, for instance, shock absorber displacements, wheel rotational speeds, braking forces, steering torques, power consumption of the steering system due to, for instance, steer by wire or servo pump, wheel speeds, vehicle speed, transverse forces and slippage values. Here again, merely two of the measuring devices 214, 215 with the associated conduits are indicated as representative examples. In addition, there are also provided further bus systems. A bus 205 connects the master controller 200 with various devices of the vehicle body and interior electronics ("electronics I") that are represented by the box 203 and may include, for instance, the generator, lights, seat position adjustment, sliding roof adjustment, window lowering and/or raising devices, an intelligent battery, etc. For the sake of clarity, this bus 205 is not extended any further. Via another bus system 204, also illustrated in it shortened form, devices for telecommunication and/or multimedia and entertainment devices ("electronics II") are connected with the master controller 200. Such devices are denoted with the reference numeral 202. The use of a plurality of bus systems 204 to 207 renders it possible to preferably operate them at data transmission rates that are respectively best suited for the devices in question, wherein such rates may be different from one another for the various buses 204 to 207. The adjustment elements and adjustment devices or members that are needed for the adjustment of the operation of the engine (motor), the brake system, the steering system etc. are connected either to the respective associated control unit or to the respective associated bus.

The configurations presented in FIGS. 1 and 2 of the drawing are merely examples which, in other embodiments, could even be put together differently. Therefore, it is essential to generate a control structure that can be utilized independently of the underlying hardware configurations and/or can be adapted to them using simple means and at only minimum cost. To this end, the functional units that are given in hardware are reflected in a control structure consisting of software-generated components.

Figure 3:
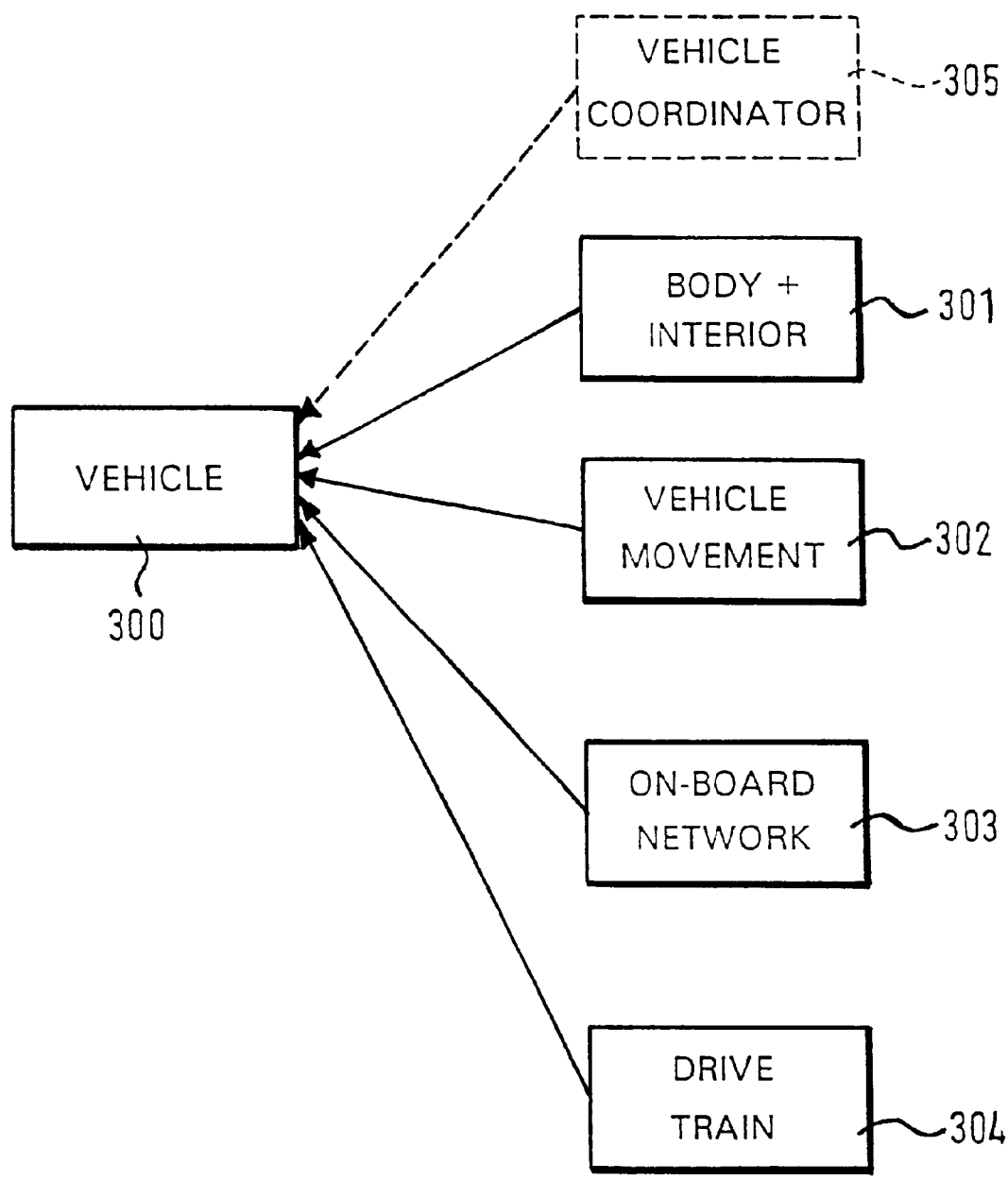
FIG. 3 is another block diagram depicting the basic components of the control system architecture for a motor vehicle considered as an overall system.

In FIG. 3, there is presented the principle of a basic structure of an overall vehicle system. Starting with a component "vehicle" 300, in which there may be optionally included a vehicle coordinator unit, it can be differentiated between four functional groups that are represented in respective components, besides the aforementioned vehicle coordinator unit 305 a vehicle body and interior component 301 a vehicular motion component 302 an on-board network component 303, and a drive train component 304.

The vehicle coordinator unit 305 can optionally be constituted as a component in its own right akin to the components vehicle body and interior 301, vehicular motion 302, on-board network 303 and drive train 304, but it could also be located directly in the component vehicle 300 itself.

In as much as a motor or engine management must be integrated into the overall vehicle concept, it is necessary to provide the component vehicle 300. The remaining components are grouped as users, resources and coordination components. The vehicle coordinator component 305 collects all of the demands of the entire vehicle and presents them, in a coordinated fashion, to the other components. In the component body and interior 301, there are anchored functional units relevant to a motor or engine management, such as certain instruments located in the dashboard or the like. These are, for instance, error warning lights, consumption indicators, but also optionally the air conditioning unit, with which the passengers are in direct communication. In the component vehicular motion 302, there are anchored all of the tasks which are related to the movement of the vehicle in all directions. Among them are the driver's commands and their capture, FDR or ESP, brake, ACC, etc.

In the following, the component drive train 304 will be described in more detail, together with its interfaces. In this component, there is made available the energy needed, for instance, for running the auxiliary devices such as the air conditioning unit and the conversion of the driver's commands. The remaining components will also be described in more detail, as needed. The individual components can be realized, depending on the implementation chosen, either as individual control devices, or as individual software blocks in a common control device, or as a combination of these two approaches. The notation appearing in FIG. 3 conforms to the Unified Modeling Language Notation; this means that the blocks 301 to 304 are parts of the block vehicle 300. This notation will also be used in the following Figures.

FIGS. 4a to 4d present more detailed views of the components introduced in FIG. 3, with a definition of the interfaces.

Figure 4A:
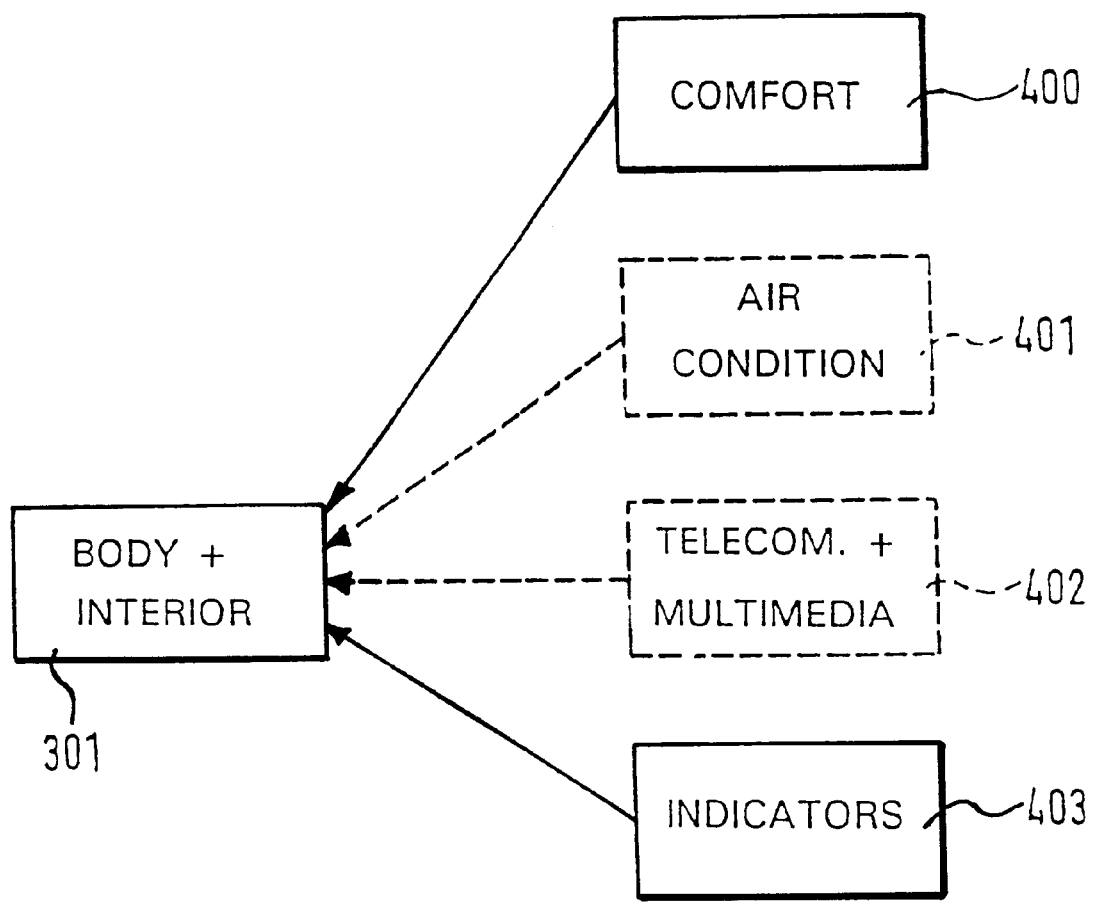
FIGS. 4a to 4d are diagrammatic views showing certain details of the components depicted in FIG. 3, together with a definition of various interfaces between such components.

FIG. 4a shows the component body and interior 301 and its possible subdivision into further components 400 to 403. The component air conditioning 401 includes the air conditioning unit (optional) which, as an auxiliary device and thus energy consumer, puts demands, such as torque and idling speed requirements, on the motor or engine management. In addition to that, certain components relating to driver and/or passenger comfort, such as heating devices or certain adjustment devices such as those employed for window lowering and/or raising, sliding roof operation, as well as electric seat position adjustment, are collected, as further energy consumers, in the block 400. Furthermore, the optional component 402 conceivably includes, telecommunication and multimedia devices such as telephone or radiophone apparatus, computer etc. Moreover, the block 403 represents the collection of various instruments in the vehicle body and interior. This includes all indicators in the interior of the vehicle which have any relation to the engine operation management, such as diagnostic lights or the like.

Figure 4B:
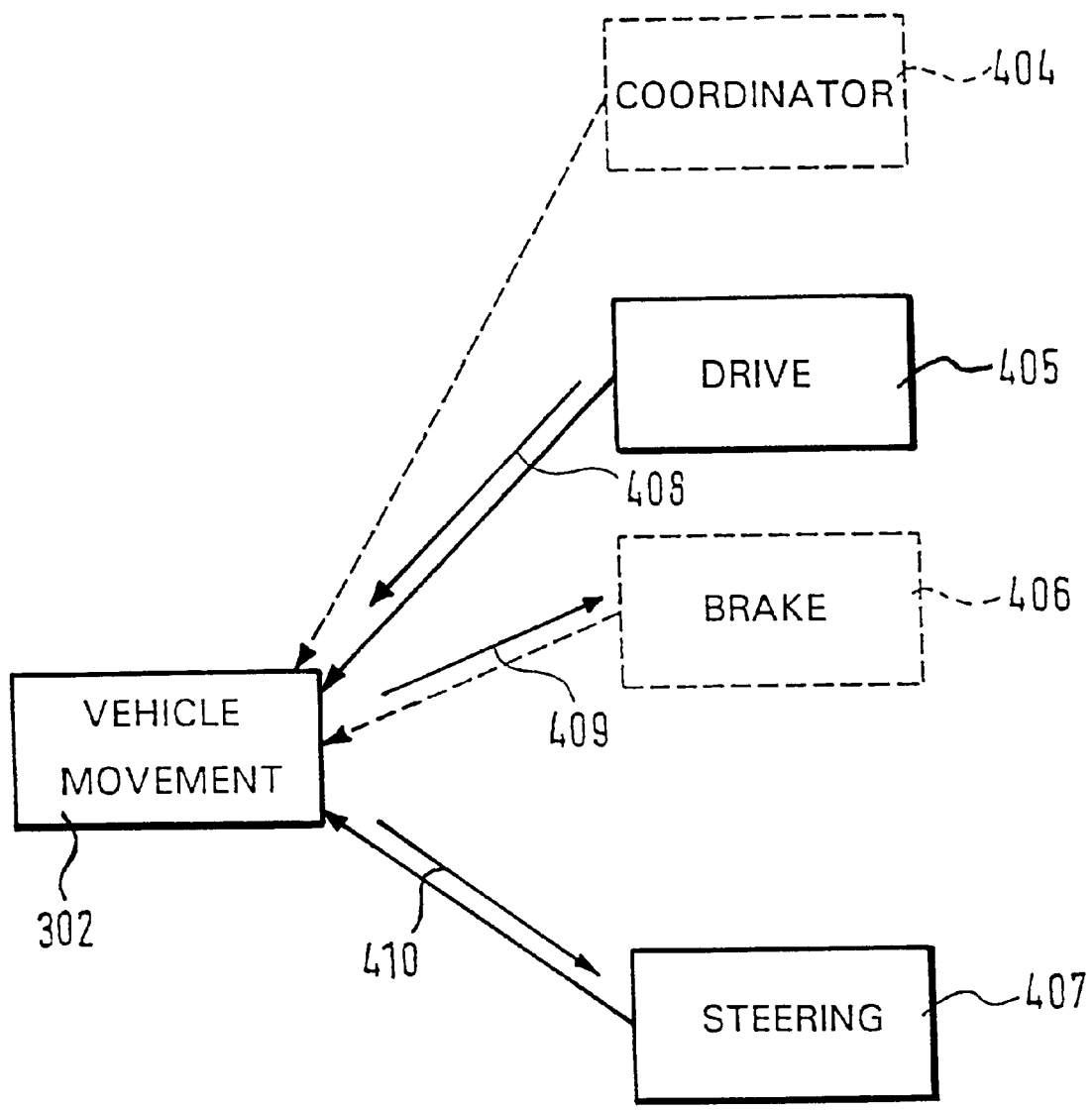

FIG. 4b shows the subdivision of the component vehicular motion 302. Herein, there are postulated respective sub-components drive 405, brake 406 and steering 407. As an option, the component brake 406 can be included as a part of a combined component drive and brake. A component coordinator 404 for the vehicle motion serves as a coordinating element for the control of all energy consumers in the region of drive, braking and steering. The component drive is oriented in accordance with the physics of the situation and includes all the functions of the drive which have bearing on the engine operation management, such as the gas pedal or the drive slippage regulation. From the component drive 405, there originates the torque requirement or power requirement which is determined, for instance, in accordance with the driver's wish expressed by the actuation of the gas pedal. The component brake 406 is also oriented in accordance with the physics in that it includes on its part all of the functions of the brake that affect the engine management, such as the brake pedal, ABS etc.

The component vehicle motion 302 or the coordinator 404 of the vehicle motion asks via an interface 409 for braking information, such as for instance the braking wish of the driver, from the component brake 406. The components drive 405 and brake 406 can also be optionally combined into a single component. A further component presented here is the steering 407. Even this component 407 is oriented in accordance with the physics and includes all of the functional units of the steering which affect the engine operation management, such as for instance the servo pump. Herein, the demand for power arising in the component steering 407 for, for instance, the servo pump or the steer by wire is presented via an interface 410.

Generally speaking, it is conceivable for the components drive 405, brake 406 and steering 407 to include, in addition to or instead of the conventional systems, also for instance electrical systems as they are already known to the art. In this case, there is omitted the heretofore customary mechanical or hydraulic override for instance from the gas pedal or from the brake pedal and, instead, the respective command data drive, brake and/or steering is captured, conducted in the form of for instance an electrical signal, and adjusted to in the respective system. The power or torque and/or engine rotational speed demands on the drive and/or engine that are needed for the drive (E-gas), brake (brake by wire) or steering (steer by wire) are then accepted and processed by the engine management.

Generally speaking, power and torque can be considered in calculations as similar or quasi-equivalent values in that the conversion from one value to the other while taking the respective rotational speed information into account does not present any difficulty to an average artisan. However, in adjusting the power using torque and rotational speed, two values can be varied.

Figure 4C:
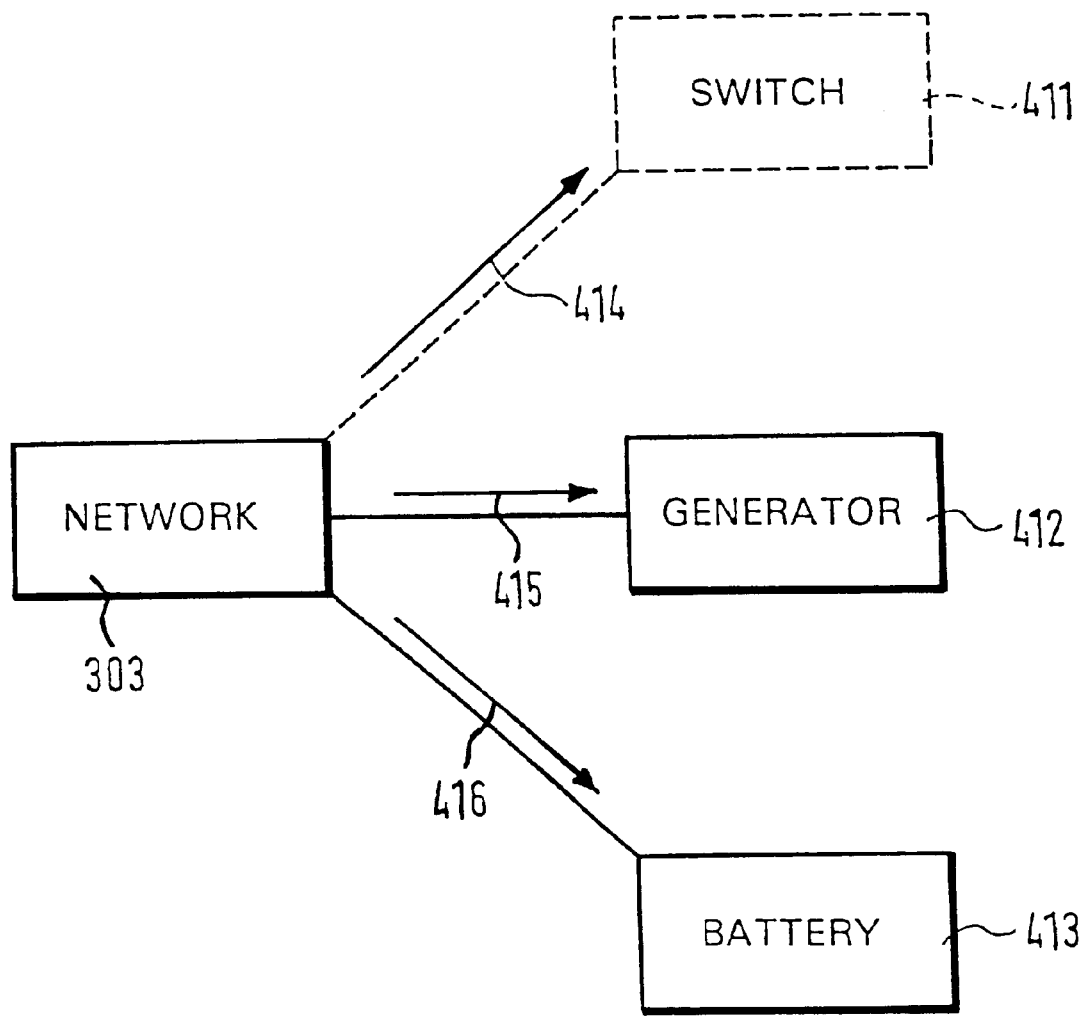

FIG. 4c shows the principle of subdivision of the component electrical on-board network 303. The task of the electrical network is the presentation of the electric power for the operation of the electrical power consumers of the vehicle. In addition, there exists the possibility of providing mechanical power through the electrical network (via the generator), in that the generator excitation and thus the consumption of the mechanical power is controlled. In special cases, it is even possible to use the electrical network as a source of mechanical power, in that the generator is operated as an electric motor that delivers mechanical power. The adjustment of the mechanical power consumption by the on-board network serves, for instance, the purpose of aiding in the cold start operation of an internal combustion engine, in that the drive has to provide an additional power output, which shortens the warm-up period, or the purpose of providing an additional braking torque, for instance in response to the request for it from the component vehicular motion. The mechanical output of the network can be used as a boost for the drive. As a result, the component network 303, together with the component drive train 304, cover the entire energy demand of the vehicle. Herein, an optimum energy generation and distribution can be achieved by a suitable engine management. Te component on-board network 303 is subdivided in to a component switching means 411, which is provided as an option and includes, for instance, the functional components ignition lock, drive-away block and in the future, possibly, an automatic starter. The release of the starting procedure is requested by the network component 303 through an interface 414. Instead of this questioning, it is also conceivable and contemplated for the component switching means 411 to originate a release signal at the point of time for commencement of the starting operation, and to send this signal to the network component 303. As an option, there may also be provided a separate component coordinator for the electrical on-board network; however, in the illustrated embodiment, this coordinator is incorporated in the component network 303. The component 304 in FIG. 4*c* is the generator which obtains a signal determining its power consumption from the component network 303 via an interface 415. If this predetermined value cannot be achieved by the generator, the component 412 reports the occurrence of an error back to the network component 303. In such an error case, the network component 303 announces that the electric power demand cannot be satisfied, upon which the vehicle coordinator decides whether more power is to be demanded from the drive train or consumers are to be shut off. In the event that this is not sufficient, standstill of the automobile is accepted after the lighting of a warning light. In the component 413, there are included all the batteries used in the vehicle. Thus, the component 413 includes the functional unit battery that includes at least one battery. The component network 303 requests from the component 413, through the interface 416, information concerning the power. The coordinator network that is included in the component network 303 controls the on=board network components, i.e. it provides a solid strategy of how the demands issued by the vehicle coordinator can be implemented in or converted into the on-board electrical network.

Figure 4D:
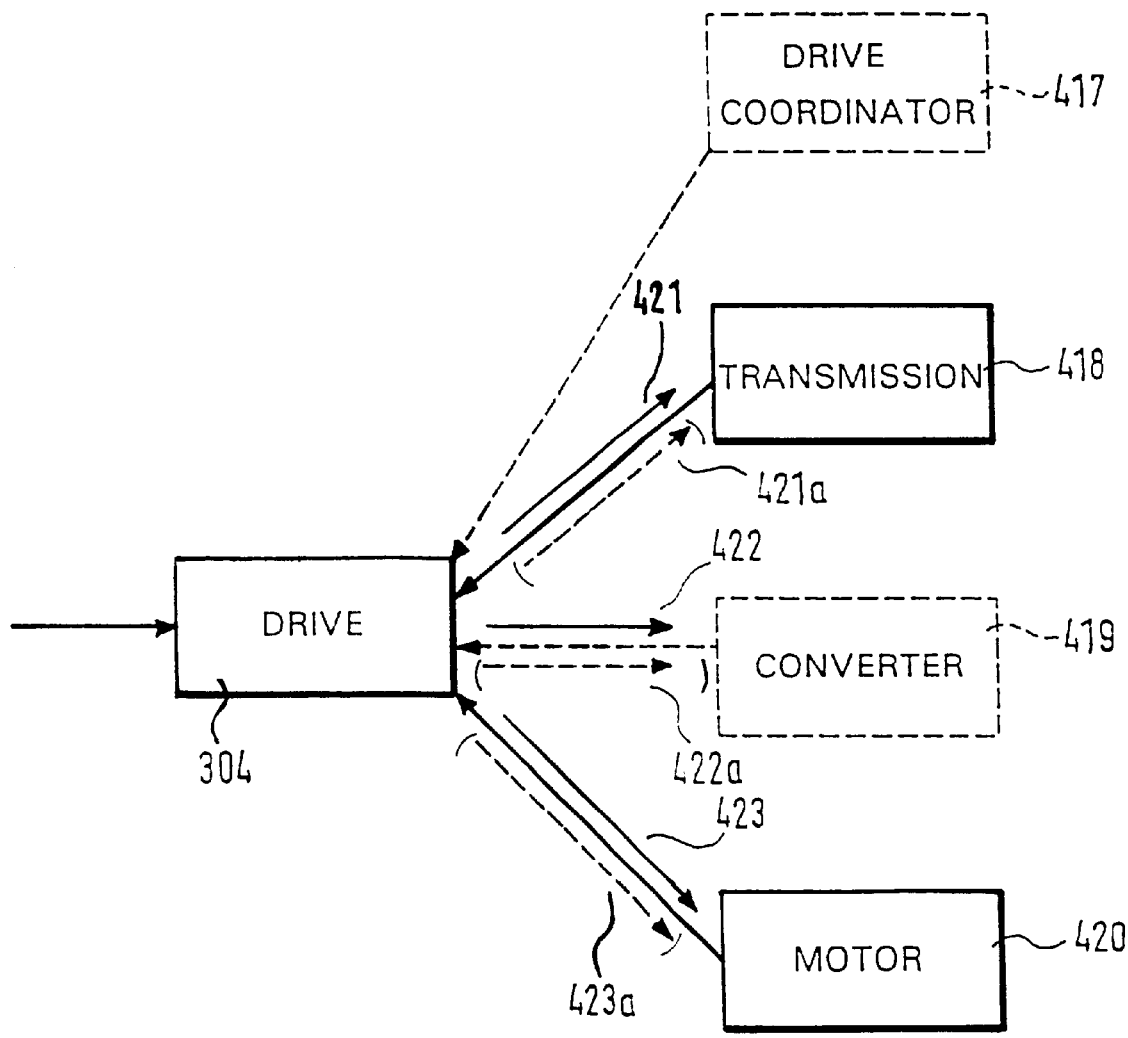

FIG. 4*d* shows the principle of the subdivision of the component drive 304. The task of the component drive 304 is to make available the requisite power for the various consumers or users. A corresponding demand, here in particular the demand for power, is issued by the vehicle coordinator or the component vehicle 300. The further refinement presents, with an optional component 417, a drive coordinator which, however, can instead be incorporated directly in the component drive 304. In addition, there are present a component transmission 418 and a component motor (or engine) 420. A component converter 419 is optional at this location and normally includes the coupling. This functional unit, and thus the component converter 419, could also be handled in the component transmission 418. The component transmission 418 also includes all functions or functional units which relate to the transmission, such as for instance the transmission ratio, the engaged gear information etc. The engaged gear information is requested at an interface 421 to the component drive 304. In addition, the positive engagement signal is transmitted through the interface 422 to the component converter 419. The component motor 420 contains the functionality or the functional units or an internal combustion engine (Diesel or gasoline fuel) and/or of a hybrid or electric motor. By the component motor 420, there is controlled the essential task of propelling the vehicle in the forward or the backward direction. In addition to this basic task, there is also the need for driving the auxiliary devices. These are not, however, controlled by the component motor 420. The demands on the component motor can be reduced to just a few simple demands. These are the presentation of a torque, either in absolute terms or as an increase or a reduction in the momentarily delivered torque, a heat output, the presentation of information about operational data such as the motor rotational speed, the actual available power interval, and the actual transmission input torque as well as the starting and the operation cessation. The component drive train 304 issues trough an interface 423 a signal indicative of the torque that depends on the power demand on the component drive train 304.

Herein, it is to be distinguished at which location of the drive train the power is detected. The power consumed by the auxiliary devices is customarily derived in internal combustion engines directly from the crankshaft, while the power made available for propelling the vehicle is influenced by the converter an the transmission. Based on these two separate power requirements, the component drive train 304 can now in a preferred embodiment determine by itself in which way the requirement for the presentation of a certain power level can be satisfied in the best possible manner. Under this expression, there is to be understood the choice of a suitable toque/rotational speed combination of the motor as well as the corresponding transmission ratio. To this end, a predeterminable transmission ratio is supplied in this currently preferred example to the component transmission 418 through an interface 421*a*, a predeterminable slippage is supplied to the converter 419 trough an interface 421*a*, and a rotational speed is supplied to the component motor 420 via an interface 423*a*. Herein, diverse strategies can be utilized, such as an optimization for fuel consumption and/or noise and/or riding comfort, etc. A combination of these criteria is also conceivable. This selection of strategy is in this detailed subdivision of the component drive 304 the duty of the drive coordinator 417 which is either optionally included at the level depicted in FIG. 4*d* or directly in the component drive 304. The drive coordinator 417 obtains the required information, which may be different depending on the strategy, by questioning the other components. Such required information includes, for instance, environmental vales and/or driving condition values and/or vehicle values and/or user values. In this manner, the overall remaining structure remains from the chosen strategy as such. It is merely necessary to make sure that the information required by the drive coordinator 417 is made available. This information can be obtained from the remaining components, even, for instance, from the components of the same level of detail (motor 420, converter 419 and transmission 420) and/or from higher levels (see FIG. 3). After the evaluation of the thus obtained information, the drive coordinator 417 establishes the suitable input values for the cooperating components motor 420, converter 419 and drive 418. So, for instance, the transmission 418 obtains the input value through the interface 421*a* to accomplish a certain transmission ratio, the converter 419 obtains the input value through the interface 421*a* to adjust to a certain slippage, and the component motor 420 obtain on its part the input value to offer at its output a certain torque at a certain crankshaft rotational speed via interfaces 423 and 423*a*. In addition, a phase lead requirement as well as requirements for self protection and dynamic behavior are for instance defined as boundary conditions of the motor torque interface already at this level. It is determined only in the component motor 420 exactly in which manner these requirements are fulfilled. Inasmuch as this occurs quite differently for instance in gas engines than in Diesel engines, different variants of the component motor 420 will be needed for these different applications. There structure will be refined in accordance with the respective requirements until ultimately the command can be issued to the respective site. This is achieved, for instance, in a gas engine by controlling the combustion air and injected fuel amount as well as the spark issuance angle, in a Diesel engine for example by controlling the injected fuel amount and the injection behavior, as well as for both kinds of engine by using other values, such as exhaust gas return, charging pressure etc.

Figure 5A:
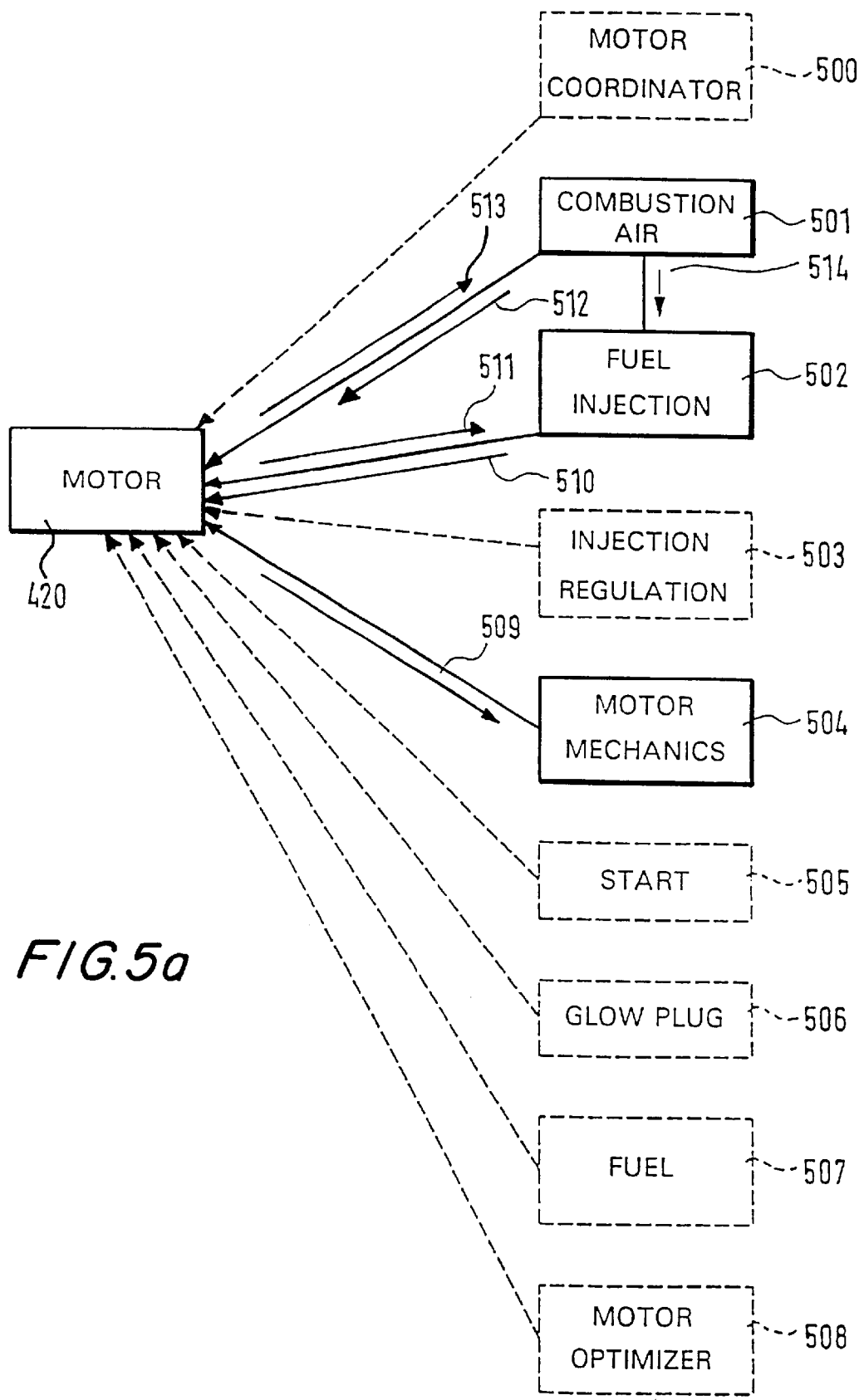
FIG. 5a is a further block diagram similar to those described above but showing additional details of an implementation of a drive or motor component of the control system, presenting control units employed in fuel management of a diesel fuel powered motor vehicle.
Figure 5B:
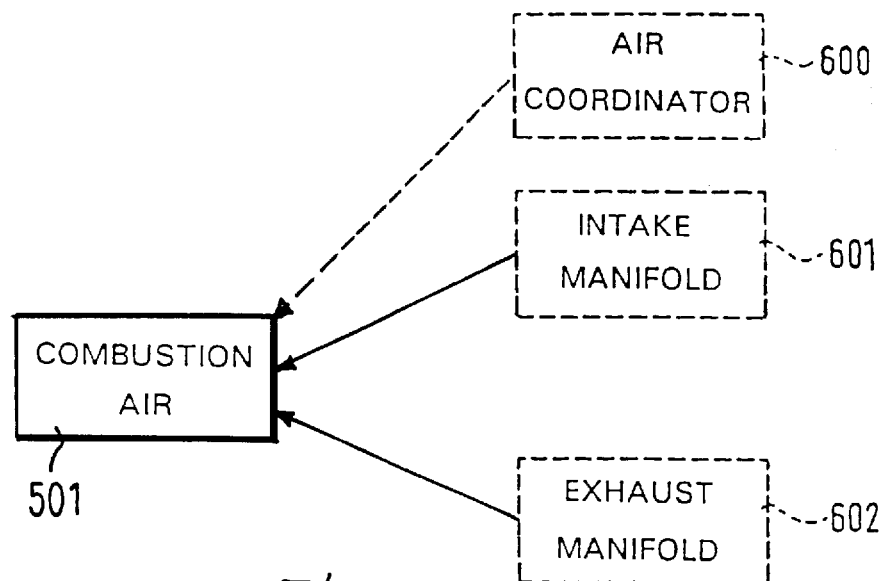
FIGS. 5b and 5c are additional diagrammatic views depicting further details and/or refinements of the motor or drive mechanics control.
Figure 5C:
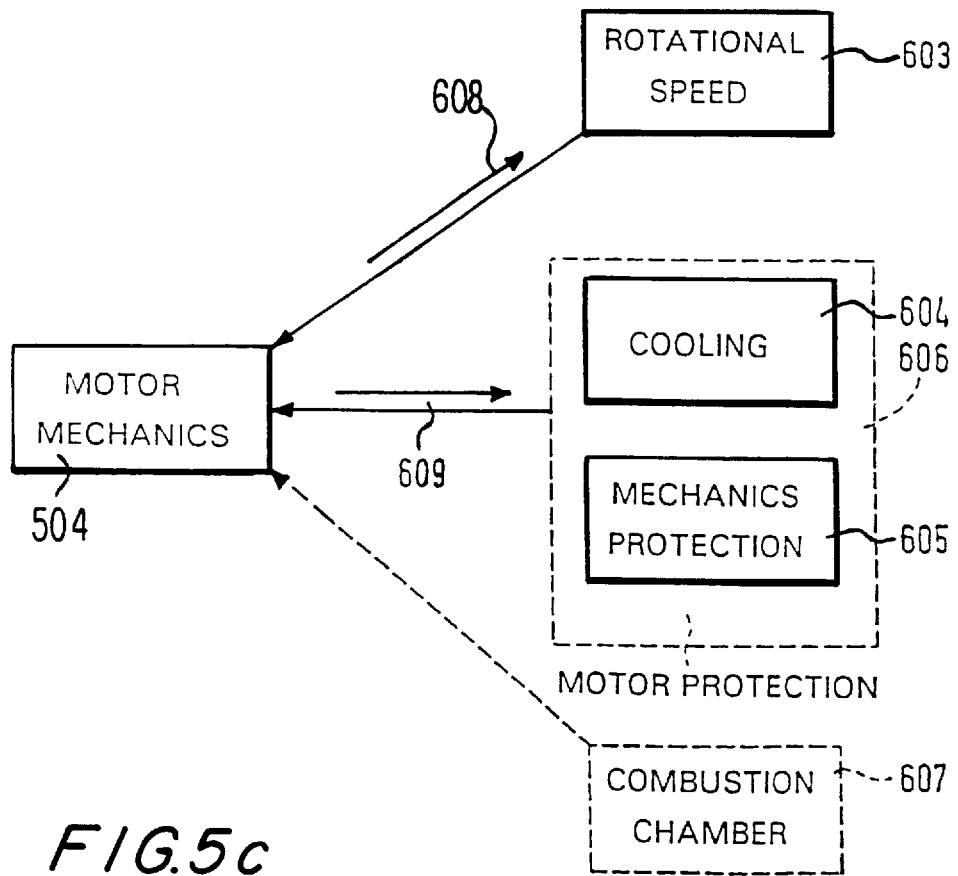

For this reason, a further refinement or breakdown of the component motor 420 is presented in FIG. 5a. Herein, FIGS. 5a to 5c are specifically directed to the implementation of the component motor 420 for a Diesel engine management. Herein, the reference numeral 500 designates a motor coordinator the duty of which is to distribute or deliver the predetermined values to the motor and to supervise the operation of the motor. To this end, the component 500 may also be optionally located in the component motor 420. A component combustion air system 501 has for its central task the presentation of information about the mass of air that is actually available and to set a desired air mass within the limits of its capability to influence the system. To this end, the air mass value is inquired about through an interface 513. An inquiry about the smoke limit, also through the interface 513, can be optionally performed for instance by the motor optimizer, in which the smoke limit can also be determined. The commands and the inquiries with respect to the combustion air system 501 are so chosen that exhaust gas emissions and fuel consumption are held at relatively low levels. To this end, the component air system 501 inquires through an interface 512 about the rotational speed information. The information about the injected fuel amount is also inquired about by the component air system 501 from a component injection system 502 via an interface 514. The fuel injection system 502 on its part receives the rotational speed information through an interface 510 and a torque pre-selection information via an interface 511. The component injection system 502 includes the fuel injection device inclusive of its mechanical drive device and the nozzles. Even though the back influence of the combustion chamber or of the combustion chambers on the injection system (closing resistance of the nozzles) is relatively small, the nozzles are still counted into the injection system. The task of the injection system 502 is to control the injected fuel amount in dependence on the angle of the crankshaft. To this end, there are given parameters that are characteristic of the injection behavior. These are in particular the injected fuel mass during the injection (integrated over the duration of the injection process) and the injection starting moment. Instead of the predetermination of these values, it would also be conceivable to freely choose the injection behavior. Besides the component injection system 502, there is provided a component injection regulation 503 which determines the required torque in dependence on an optimizing criterion predetermined from the outside. As an option, the component 503 could also be incorporated in the component injection system 502. A component motor optimizer 508 could also be optionally located, as the component motor coordinator 500, in the component motor 420. The component motor optimizer 508 is not absolutely necessary, but it brings about an improvement in the end results. The component motor optimizer 508 has the task to determine the optimization criterion under which the motor torque is to be realized. Herein, fuel consumption, emissions, heat and dynamics are being considered as optimization criteria. When the fuel consumption criterion is being used, the desire is to achieve the required motor output torque with the lowest possible amount of fuel. When using the emission criterion, the desire is to achieve the requisite motor output torque with lowest possible emissions. When the required motor output torque is achieved with the highest possible heat output, it is referred to as the heat criterion. When the dynamic criterion is to be followed, ten the requisite motor output torque is to be achieved with the highest possible torque reserve that is dynamically exploitable. A component motor mechanics 504 is to be considered as a further component. This component 504 gathers information, through an interface 509, about the rotational speed. Morever, limitations for instance for engine protection, such as rotational speed limits or at least one temperature limit are being inquired about through this interface 509 as well. The tasks to be performed by the component motor mechanics 504 are calculation of the motor drag torque, protection from mechanical overloading (torque limitation and rotational speed limitation by the formation of a limiting torque), maintenance of a combustion chamber temperature limit, assurance of proper lubrication of the motor mechanics owing to the limiting torque, avoidance of sudden torque changes in order to keep the noise emissions at a relatively low level, determination of the motor rotational speed and of an associated error information (gravity of the error) and the determination of the motor temperature or cooling fluid temperature. About components starting system 505, glow plug system 506 and fuel system 507, it can be said that they can also be optionally located within the component motor mechanics 504. The task of the component starting system 505 consists in the switching on of the electric motor for the starting of the main motor or engine, and in switching this electric motor off when the engine has started. In addition thereto, it is responsible for the starter protection. The component glow plug system 506 incorporates the function of glow ignition in Diesel engines. In the component fuel system 507, there are included parts of the fuel supply system such as for instance the fuel tank. The component 507 is not absolutely necessary and can be omitted.

Essential ones of these components are, among others, motor mechanics 504 and the combustion air system 501 which are illustrated in FIGS. 5b and 5c of the drawing.

FIG. 5b of the drawing illustrates an advantageous embodiment of the invention based on the principle of further refinement of the component combustion air system 501. Herein, one obtains a component combustion air coordinator 600, a component intake manifold 601 and a component exhaust manifold 602. In another exemplary embodiment, these three components 600, 601 and 602 could also be located directly in the component combustion air system 501. The component intake manifold 601 comprises the physical combustion air intake region all the way from the ambient atmosphere to the intake valves. The component exhaust manifold 602 includes the physical region between the exhaust valves and the end of the exhaust pipe. Finally, the component combustion air system coordinator 600 serves as a coordinating component of the combustion air system and incorporates the tasks of regulating the return of a portion of the exhaust gases (ARF) as well as the regulation of the throttle flaps or valves.

The sub-components of the component motor mechanics 504 that are shown in a detailed view of FIG. 5c are by-and-large self-explanatory; they include the tasks that belong to their physical counterparts. The rotational speed capture is performed in the component 603, and this captured value is queried through an interface 608. A separately depicted combustion chamber component 607 for internal combustion motors is optional but not absolutely necessary.

There are also provided two other components, namely a cooling system component 604 and a motor mechanics protection component 605. These two components 604 and 605 can be combined with one another in a component motor protection 606. From this combined component motor protection 606, the limitations that have already been mentioned before are being asked for through an interface 609. The component rotational speed capture 603 contains for instance further components such as a cam shaft and crankshaft, from which the respective associated rotational speed is captured and processed or prepared.

Figure 6:
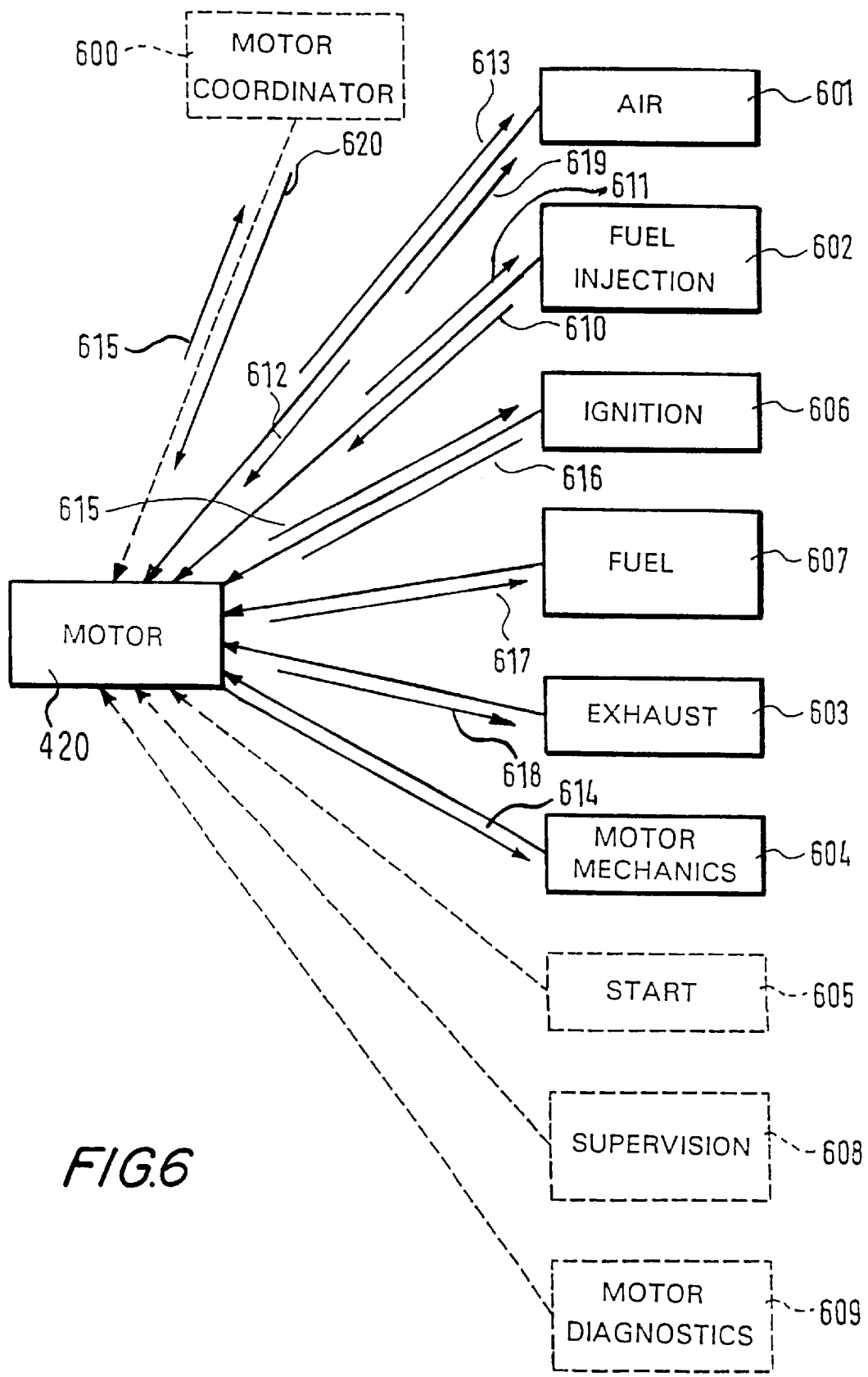
FIG. 6 is yet another block diagram showing details of the implementation of the motor component part of control system of the present invention for fuel management in the special case of a gasoline-powered motor vehicle.

Besides the heretofore presented more detailed implementation of the motor component 420 as configured when the motor is an internal combustion engine designed to run on a Diesel fuel, here can also be presented a more detailed implementation of the motor component 420 as configured for use in conjunction with an internal combustion engine designed for running on gasoline. This latter implementation is depicted in FIG. 6 of the drawing. In this application, there is again optionally provided, for the structuring of the gasoline engine management, a motor coordinator component 600. This component motor coordinator 600 can be located, as in the case of Diesel engine management, either at the refinement level depicted in FIG. 6 or in the component motor 420 itself. A torque information is fed into the motor coordinator 600 through an interface 615. On the other hand, the motor coordinator 600 makes inquiries through an interface 620 about the rotational speed, efficiency and the degree of filling. Depending on where the motor coordinator 600 is located, the further interfaces extend either from the component motor 420 when the component motor coordinator 600 is incorporated in the component motor 420, or from the component motor coordinator 600 when the latter is implemented as a separate component. A component combustion air system 601 includes the intake manifold with sensors and adjusting members. Among the adjusting members, there are included, besides the throttle valve or flap, possibly suction pipe switching, for instance a cam shaft adjuster, the intake and exhaust valves, turbo charger and/or an AGR system. The tasks if the component combustion air system 601 are to capture the air mass (degree of filling) that is actually available, and the adjustment of a required degree of filling with the available filling adjusters. To this end, the component combustion air system 601 inquires from the component motor 420 and/or the component motor coordinator 600 through an interface 612 about the rotational speed. Besides this, the degree of filling is inquired about from the combustion air system through an interface 619. This information is then available to other components such as a fuel injection system component 602 and/or an ignition system component 606. On the other hand, the desired operational mode as well as a desired filling degree value are being fed to the component combustion air 601 through an interface 613. The component fuel injection 602 inquires through an interface 610 about the actual speed or rotation value as well as about the information about the degree of filling that had been gathered from the combustion air system. Through an interface 611, the fuel injection system again obtains the operational mode information and, moreover, the fuel mixture composition, that is the ratio of fuel to air which is referred to in an abbreviated fashion as lambda. The task of the fuel injection system component 602 resides in the determination of the fuel requirement for a given fuel mixture (lambda) and mode of operation, the regulation of the fuel mixture (lambda), the calculation of the injection timing and position, as well as the realization of the injection by the actuation control of the injection valves. As a further component, there is presented an ignition system component 606. This component 606 inquires through the interface 616 about the rotational speed gathered from the motor mechanics, as well as the filling degree information gathered from the combustion air system. On the other hand, it obtains through an interface 615 again the operational mode predetermination information and the predetermined value of the efficiency. The component ignition 606 includes the respective functional units combustion chamber and ignition device. The tasks are the ignition and combustion in the combustion chamber, the functions relating to the determination of the ignition angle, the making available of the spark energy (completion time), the realization of the ignition spark, the knock recognition and regulation, the failure recognition, the combustion chamber pressure capture and/or the measurement of the ion stream for the adjustment of the combustion process. As a further component, there is indicated at 607 a fuel system component. This component 607 obtains through an interface 617 the information concerning the predetermination of the operational mode and of te fuel rail pressure. The component fuel system 607 contains parts for the fuel delivery system such as the fuel tank, fuel tank ventilation valve, fuel pump, fuel rail and has the tasks of controlling and diagnosing the individual components such as for instance EKP adjustment, fuel tank venting, fuel tank venting diagnosis, fuel tank filling degree measurement and rail pressure regulation. A further component exhaust system 603 obtains, through an interface 618, merely the predetermination information concerning the operational mode. The component exhaust system 603 contains the functional units for exhaust gas after treatment such as, for instance, secondary air system, an exhaust gas temperature sensor for exhaust gas temperature regulation and the catalytic converter, as well as the De-NOx, catalytic converter purge and/or desulfurization functions associated therewith. A motor mechanics component is indicated as a further significant component of the overall system at 604. From this component 604, there is derived by inquiry through one interface 614 the rotational speed information, the temperature information and the cam shaft and/or crankshaft position information. Condition values of the component motor mechanics 604 are the position of the crank shaft and/or of the cam shaft obtained via respective position sensors, as well as the motor rotational speed; in addition, motor temperature and/or the captured motor drag torque. Rotational speed limit and torque limit are provided as limitations. Further components 605, 608 and 609 may be provided optionally, that is they are not absolutely necessary. The component 605 is that relating to the starting system and includes the functional unit starter. The task of the component 605 is the establishment of operational readiness by the control of the starter, the starter protection, as well as of the automatic start. As an option, the starter or the component starting system 605 can be incorporated in the drive train component 304. The component 608 is a supervision system component and has the duty to recognize impermissible or dangerous motor conditions. This occurs during the examination of actual and desired values for plausibility as well as the calculation of the permissible values. Additionally, the component 608 causes the performance of corrective action aimed at assuring a safe condition when the permissible values have been exceeded. Finally, the component 609 is a motor diagnostics system component, which means that its task is to examine the motor and its components for operativeness, as well as to collect the information about errors occurring in the individual components and to manage the same. The optional component motor coordinator 600 has assigned to it the task of determine the motor operation mode in accordance with various criteria, based on all of the motor components. These criteria may be, for instance, safety and/or emissions and/or fuel consumption and/or comfort. Various combinations or weightings of these criteria are conceivable for the determination of the motor operational mode. In addition, the requests for the possible adjustment actions (filling, mixture, ignition) are distributed in the component motor coordinator while taking the aforementioned boundary conditions (limitations) into consideration.

Figure 7:
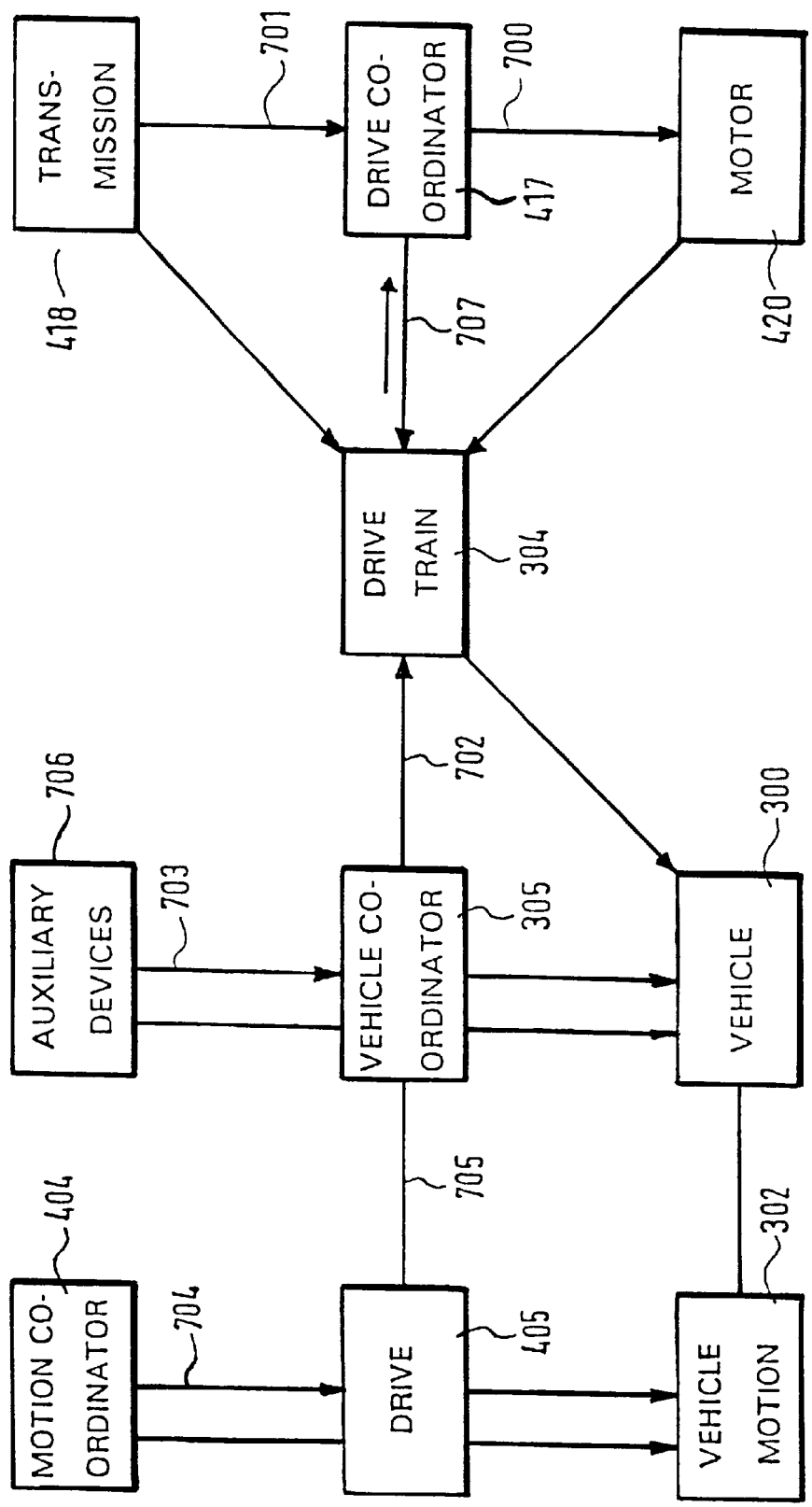
FIG. 7 is a flow chart illustrating the flow of data in the control system of the present invention with the capture of the motor vehicle driver input via the gas pedal as a part of a vehicle movement component, or in the more detailed resolution of the drive component up to the determination of the control input data for the drive unit, irrespective of the kind of motor powering the vehicle.

A further exemplary implementation depiction illustrates in FIG. 7 the translation of a driver's wish and other influencing values into commands for the component motor 420 while taking into account the power or torque and rotational speeds for the component motor 420 in general, that is independently of the respective motor type. The drivers wish is a part of the component drive 405 as a rotational speed and/or torque command or a power command. Also in the component drive 405, there is provided a further torque command obtained from the driving speed regulation. The driving stability regulation (ASR, MSR, ESP), which is here located in the component vehicle motion 404, issues on its part a torqueKF through an interface 704. If adaptive driving stability regulation (ACC) is used instead of the aforementioned driving stability regulation, then the command is delivered not only to the component drive 405, but also to the component brake 406 which then can be, however, combined into a component drive and brake. Different commands would then result for the combined component drive and brake than for the separate component drive and component brake. From these internal and external commands, the component drive 405 on its part generates rotational speed and torque commands for the vehicle coordinator 305. These $torque_v$ and $rotational\text{-}speed_v$ command signals are furnished to the component vehicle coordinator 305 through an interface 705. As explained before in connection with FIG. 4b, the components 404 and 405 are parts of the component vehicle movement 302. In turn, this component 302 is a part of the component vehicle 300, together with, among others, the component vehicle coordinator 305, the component drive train 304 and auxiliary devices 706. In this respect, it is to be mentioned that, for the sake of clarity, all of the auxiliary devices, such as the air conditioning system, the servo pump etc. of the other components have been grouped together in the component auxiliary devices 706. These auxiliary devices collectively a torque ($torque_{NA}$) and rotational speed ($rotational\text{-}speed_{NA}$) or power command input to the component vehicle coordinator 305 through an interface 703. The vehicle coordinator component 305 forms from these command signals another rotational speed command ($rotational\text{-}speed_F$) and also another torque command ($torque_F$), while another torque command ($torque_N$) is derived from the auxiliary devices. These command signals are passed through to the component drive train coordinator 417 via the component drive train 304 and respective interfaces 702 and 707. The component drive train 304 then forms, in this example, from these values, and further taking into consideration further power data coming from the component transmission 418 through an interface 701 in the form of $torque_G$ and $rotational\text{-}speed_G$, a power command signal for the component motor 420. Moreover, a $torque_{KA}$ and a $rotational\text{-}speed_{KA}$ are transmitted as command values to the component 420.

With the structure of the components presented in the drawing, one is then open for taking further developments in the motor and/or transmission into consideration, such as for instance the use of hybrid or electric motors as the main power sources of a vehicle, which can then be captured and controlled analogously to the manner described above in conjunction with gasoline or Diesel fuel powered internal combustion engines.

With the definition of the interface or interfaces that are associated with the individual components, there is given a symbolic association of the exchanged data or information with the respective type of communication (command or inquiry). The number and/or the configuration of these interfaces is not to be considered to be an indication for the actual interface structural units embodied in hardware. Rather, the above rendered definition makes it possible to achieve a flexible distribution and/or association of real, hardware-implemented and/or physical interface information to individual interfaces and hence to the individual components.

It will be understood that each of the elements described above, or two or more together, may also find a useful application in other types of constructions differing from the type described above.

While the present invention has been described and illustrated herein as embodied in a specific construction of a motor vehicle control arrangement, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A computer system for controlling operation of a motor vehicle, said computer system comprising a plurality of different predetermined computer system components connected with each other to form a control structure for respective physical components of the motor vehicle corresponding to said computer system components, said control structure being independent of any particular hardware arrangement of the physical components, said computer system components including a first component corresponding to the motor vehicle as a whole and a second component corresponding to a drive system of the motor vehicle, each of said computer system components including at least one functional unit, whereby demands of the physical components of the motor vehicle that are not integral parts of said drive system are taken into consideration;

a plurality of interfaces interposed between said computer system components and comprising means for bidirectional transmission of data between said computer system components;

means for storing information regarding said computer system components and said interfaces, said means for storing information including at least one memory;

means for controlling said at least one functional unit in each of said computer system components and said motor vehicle as a whole by controlling said computer system components including said first component, said means for controlling said at least one functional unit including means for generating request signals and inquiry signals for transmission of said data through said interfaces between said computer system components; and means for controlling operation of said drive system according to said data exchanged bidirectionally through said interfaces between said computer system components forming said control structure.

2. The computer system as defined in claim 1, wherein said first component is divided into additional components including a vehicle body and interior component, a vehicle movement component, an on-board electrical network component and a drive train component, and wherein said interfaces are arranged between said additional components.

3. The computer system as defined in claim 2, wherein said vehicle body and interior component includes an indicator device component.

4. The computer system as defined in claim 2, wherein said additional components include an air conditioning component, a comfort electronics component, a telecommunications component and a multimedia component and said interfaces are provided between said air conditioning component, said comfort electronics component, said telecommunications component and said multimedia component and at least one other computer system component.

5. The computer system as defined in claim 2, wherein said on-board electrical network component includes further components, said further components include a generator component and a battery component and said interfaces include means for transmitting power request signals to said generator component and power inquiry signals to said battery component between said further components.

6. The computer system as defined in claim 5, wherein said on-board electrical network component includes switching means and said interfaces include means for transmitting starting operation release inquiry signals.

7. The computer system as defined in claim 2, wherein said additional components include a motor mechanics component and said motor mechanics component includes a rotation speed capture component and a motor protection component and said interfaces include means for transmitting rotation speed inquiry signals from said rotational speed capture component and means for transmitting limitation inquiry signals from said motor protection component.

8. The computer system as defined in claim 2, wherein said additional components include a combustion air system component and said combustion air component includes an intake manifold component and an exhaust manifold component.

9. The computer system as defined in claim 2, wherein, when said motor vehicle is a gasoline-powered vehicle, said additional components include a motor mechanics component, an exhaust system component, a fuel supply system component, a fuel injection system component, a combustion air system component and a motor coordinator component, and wherein said interfaces include means for transmitting at least one of rotational speed signals, position signals and temperature inquiry signals from said motor mechanics component, means for transmitting an operation mode request signals from said exhaust system component, means for transmitting at least one operation mode signal and rail pressure request signal from said fuel supply system component, means for transmitting at least one of operation mode request signals and fuel mixture composition requires signals and at least one of filling degree inquiry signals and rotation speed inquiry signals from said fuel injection system component, means for transmitting at least one of operation mode request signals and efficiency request signals and at least one of rotation speed inquiry signals and filling value inquiry signals from said ignition system component, means for transmitting at least one of rotational speed inquiry signals and filling degree inquiry signals and at least one of operation mode request signals and desired filling degree request signals from said combustion air system component and means for transmitting torque request signals and at least one of rotation speed inquiry signals, efficiency inquiry signals and filling degree inquiry signals from said motor coordinator component.

10. The computer system as defined in claim 9, wherein said motor coordinator component is located outside of said motor mechanics component and is interposed between said motor mechanics component and remaining ones of said additional components.

11. The computer system as defined in claim 2, wherein said vehicle movement component includes further components, said further components include a drive component, a brake component, a steering component and a vehicle movement coordinator component, and wherein said interfaces include means for transmitting at least one of torque request signals, brake inquiry signals and power inquiry signals between said further components.

12. The computer system as define in claim 11, wherein said drive train component includes further components and said further components include a transmission component, a motor component and another drive component and said interfaces include means for transmitting positive engagement inquiry signals, engaged gear inquiry signals and torque request signals between said further components; and wherein said means for controlling the operation of said drive system is operative for presenting a power request signal to said drive train component.

13. The computer system as defined in claim 12, wherein said drive train component includes a drive train coordinator component and another of said interfaces is provided between said further components and said drive train coordinator component for transmission of a transmission ratio signal, slippage signals, rotational speed signals and torque request signals.

14. The computer system as defined in claim 13, wherein said additional components include an auxiliary devices component; and wherein said drive components include means for controlling said drive according to torque request signals derived from said vehicle movement coordinator component, at least one of rotational speed signals and torque request signals derived from said drive components, at least one of rotational speed signals and torque request signals derived from said auxiliary devices component, at least one rotational speed signals and torque request signals derived from said vehicle movement coordinator component, at least one or rotational speed signals and torque request signals derived from said transmission component and at least one of rotational speed signals and torque request signals derived from said drive train coordinator component.

15. The computer system as defined in claim 13, wherein said additional components include a motor mechanics component, a fuel injection system component and a combustion air system component, and respective ones of said interfaces between said motor mechanics component, said fuel injection system component, said combustion air system component and others of said additional components, and wherein said interfaces include means for transmitting at least one of rotational speed signals and limitation inquiry signals from said motor mechanics components, means for transmitting at least one of rotational speed inquiry signals and torque request signals from fuel injection system component and means for transmitting at least one of rotational speed signals, injected fuel amount signals and combustion air mass inquiry signals from said combustion air system component.

16. The computer system as defined in claim 15, further comprising a further one of said interfaces for transmitting a smoke level inquiry signal from said drive train component, when said motor vehicle is a Diesel-powered vehicle.

\* \* \* \* \*